United States Patent
Linna et al.

(10) Patent No.: US 6,953,024 B2
(45) Date of Patent: Oct. 11, 2005

(54) METHOD OF CONTROLLING COMBUSTION IN A HOMOGENEOUS CHARGE COMPRESSION IGNITION ENGINE

(75) Inventors: Jan-Roger Linna, Boston, MA (US); Robert Bowyer, Cambridge (GB); Bernard J. Challen, Sussex (GB); John Paul Mello, Arlington, MA (US); Peter Palmer, Carson City, NV (US); Richard Stobart, Cambridge, MA (US)

(73) Assignee: Tiax LLC, Cambridge, MA (US)

( * ) Notice: Subject to any disclaimer, the term of this patent is extended or adjusted under 35 U.S.C. 154(b) by 269 days.

(21) Appl. No.: 10/223,573

(22) Filed: Aug. 19, 2002

(65) Prior Publication Data
US 2003/0145836 A1 Aug. 7, 2003
(Under 37 CFR 1.47)

Related U.S. Application Data
(60) Provisional application No. 60/313,256, filed on Aug. 17, 2001.

(51) Int. Cl.[7] ............................................. F02M 7/00
(52) U.S. Cl. ..................................... 123/435; 123/419
(58) Field of Search ............................... 123/435, 436, 123/419, 295, 304, 294; 701/101

(56) References Cited

U.S. PATENT DOCUMENTS

| | | |
|---|---|---|
| 5,253,632 A | 10/1993 | Brooks |
| 5,458,102 A | 10/1995 | Tomisawa et al. |
| 5,467,757 A | 11/1995 | Yanagihara et al. |
| 5,476,072 A | 12/1995 | Guy |
| 5,503,126 A | 4/1996 | Sakakibara et al. |
| 5,535,716 A | 7/1996 | Sato et al. |
| 5,605,132 A * | 2/1997 | Hori et al. ............. 123/406.24 |
| 5,623,412 A | 4/1997 | Masson et al. |
| 5,636,614 A | 6/1997 | Morikawa |
| 5,682,856 A | 11/1997 | Tomisawa et al. |
| 5,697,332 A | 12/1997 | Asai et al. |
| 5,740,045 A | 4/1998 | Livshiz et al. |
| 5,743,244 A | 4/1998 | Bush et al. |
| 5,832,880 A | 11/1998 | Dickey |
| 5,954,783 A | 9/1999 | Yamaguchi et al. |
| 6,119,654 A | 9/2000 | Heiselbetz et al. |
| 6,230,683 B1 | 5/2001 | zur Loye et al. |
| 6,286,482 B1 * | 9/2001 | Flynn et al. ................. 123/435 |
| 6,363,317 B1 * | 3/2002 | Druzhinina et al. ........ 701/104 |
| 6,698,394 B2 * | 3/2004 | Thomas ...................... 123/241 |

FOREIGN PATENT DOCUMENTS

| | | |
|---|---|---|
| EP | 0810363 A2 | 12/1997 |
| EP | 1052383 A2 | 11/2000 |

(Continued)

OTHER PUBLICATIONS

Inagaki et al., "An adaptive fuel injection control with internal model in automotive engines", (Nov. 27, 1990), vol. 1, Conf. 16, pp. 78–83, XP010038111.

(Continued)

*Primary Examiner*—Carl S. Miller
(74) *Attorney, Agent, or Firm*—Wolf, Greenfield & Sacks, P.C.

(57) ABSTRACT

A method of controlling combustion in an homogenous charge compression ignition engine through indirect mechanisms. The method utilizes a predictive model so that combustion can be controlled over a wide range of operating conditions while maintaining optimum operation with respect to efficiency and emissions. The methods include an adaptive aspect, which allows the predictive model to be updated if deemed necessary. Furthermore, the methods include a model with a plurality of control modes. A control mode can be chosen to optimize the engine for one of a plurality of output characteristics, including response time, efficiency, or emissions characteristics.

23 Claims, 8 Drawing Sheets

FOREIGN PATENT DOCUMENTS

| | | |
|---|---|---|
| JP | 11-2173 | 1/1999 |
| WO | WO98/10179 | 3/1998 |
| WO | WO99/40301 | 8/1999 |
| WO | WO 99/42718 A1 | 8/1999 |
| WO | WO99/42718 | 8/1999 |
| WO | WO 00/26526 A1 | 5/2000 |
| WO | WO 01/44644 A2 | 12/2001 |

OTHER PUBLICATIONS

Magnus Christensen and Bengt Johansson, Per AmnJus and Fabian Mauss, "Supercharged Homogeneous Charge Compression Ignition" 1998 Society of Automotive Engineers, Inc., Technical Papers pp. 980787 143–157.

Magnus Christensen and Bengt Johansson, "Homogeneous Charge Compression Ignition with Water Injection", Society of Automated Engineers Technical Paper 1999–01–0182, Mar. 1–4, 1999.

Magnus Christensen and Bengt Johansson, "Influence of Mixture Quality on Homogeneous Charge Compression Ignition", Society of Automated Engineers Technical Paper 962454, Oct. 19–22, 1998.

Jurgen Willard, Rolf–Gunther Nieberding, Guide Vent and Christian Enderle, "The Knocking Syndrome–its Cure and its Potential" Society of Automated Engineers Technical Paper 982483, Oct. 19–22, 1998.

Hisakazu Suzuki, Noriyuki Koike, and Matsuo Odaka, "Combusion Control Method of Homogeneous Charge Diesel Engines" Society of Automotive Engineers, Technical Paper 980509. 1998, pp. 89–95.

S. M. Aceves, J. R. Smith, C. K. Westbrook and W. J. Pitz, "Compression Ratio Effect on Methane HCCI Combustion", Journal of Engineering for Gas Turbines and Power, Jul. 1999, vol. 121, pp. 569–574.

* cited by examiner

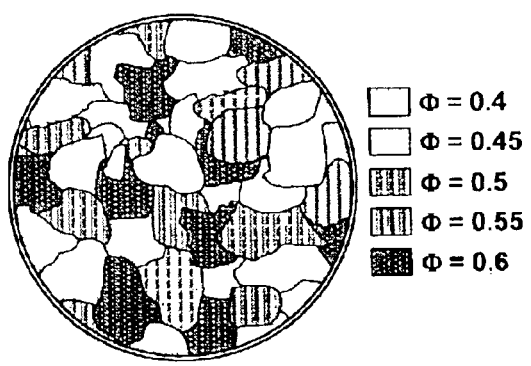 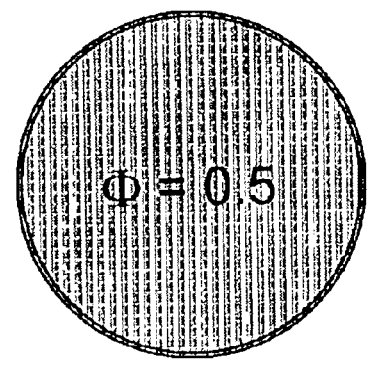
Figure 3a                    Figure 3b

METHOD OF CONTROLLING COMBUSTION IN A HOMOGENEOUS CHARGE COMPRESSION IGNITION ENGINE

CROSS REFERENCE TO RELATED APPLICATIONS

This application claims the benefit of U.S. Provisional Patent Application No. 60/313,256 filed Aug. 17, 2001 which is hereby incorporated by reference.

FIELD OF THE INVENTION

This invention relates generally to a method of controlling an internal combustion engine configured to burn a premixed charge of air and fuel, using auto-ignition to initiate combustion. In particular the invention relates to a predictive model based control system to control a process by indirect mechanisms so that combustion can be controlled over a wide range of operating conditions while maintaining optimum operation with respect to efficiency and emissions.

BACKGROUND OF THE INVENTION

In a Premixed Compression Ignition (PCI) engine or Homogenous Charge Compression Ignition (HCCI) engine, fuel is introduced into the cylinder prior to or early during the compression stroke, i.e. prior to movement of the piston towards top dead center (TDC). As the piston moves towards TDC during the compression stroke, the air and fuel mixture is compressed. As a consequence, the temperature and pressure within the cylinder increases continuously during the compression stroke. The increasing temperature results in auto ignition of the air and fuel mixture at crank angles at or near TDC. The result is combustion characterized by a rapid cascade of detonations in different zones of the cylinder as the piston is approaching TDC. This allows the realization of an effective expansion ratio approaching the geometric compression ratio (i.e, maximum efficiency) of the engine. Additionally, if the air and fuel mixture is sufficiently lean, the engine-out $NO_x$ and soot emissions will be dramatically lower than those of typical Diesel and SI engines.

Most HCCI engines lack an actuating mechanism capable of directly regulating the start of combustion and the rate of heat release in combustion. Instead, combustion begins when the air and fuel mixture has been compressed to sufficiently high pressures and temperatures, and the progression of combustion is primarily determined by the chemical kinetics of the combustion reaction

SUMMARY OF THE INVENTION

The methods of the present invention are adapted to control combustion in a homogenous charge compression ignition engine. Controlling combustion includes the use of a predictive model based control system to control the combustion process by indirect mechanisms. The control methods include adapting a model to reflect changes in the operation of the HCCI engine. They include choosing between multiple control modes to best meet the immediate needs of the engine. A method may include one or more of the aforementioned aspects, each independently or in combination, contributing to improved control of combustion in a HCCI engine.

In one aspect of the invention, a method is disclosed for controlling combustion in an compression ignition distributed reaction engine. The method comprises providing a model, and identifying a desired time for combustion. It also comprises measuring values of a plurality of engine operating parameters and providing the values to the model and employing the model to define actuator control commands associated with start of combustion occurring at the desired time. Additionally it involves controlling the combustion in the engine with the actuator control commands; measuring an actual time for the start of combustion; and updating the model based on a difference between the desired time and the actual time for the start of combustion.

In another aspect of the invention, a method of controlling combustion in a compression ignition distributed reaction engine is disclosed. The method comprises providing a model for controlling the start of combustion in a compression ignition distributed reaction engine. The model comprising a plurality of control schemes for operating the engine. The method includes supplying engine speed and/or engine load requirements as inputs to the model; measuring values of a engine operating parameters; choosing at least one of the plurality of control schemes after evaluating the inputs and the engine speed and/or load requirements to create a chosen control scheme; and controlling the start of combustion in the engine with the chosen control scheme.

In yet another aspect of the invention, a method is disclosed for controlling combustion in a CIDR engine to a desired behavior. The method comprises sensing at least one engine operating condition and predicting, based at least in part on the at least one sensed engine operating condition, an engine behavior. It further comprises setting at least one actuator to a desired set point based, at least in part, on the at least one of the predicted dynamic behavior and the chemical kinetics to obtain the desired engine behavior.

Various embodiments of the present invention provide certain advantages and overcome certain drawbacks of prior control methods. Embodiments of the invention may not share the same advantages, and those that do may not share them under all circumstances. This being said, the present invention provides numerous advantages including the noted advantage of improved control of a combustion process in a HCCI engine.

Further features and advantages of the present invention, as well as the steps associated with various embodiments, are described in detail below with reference to the accompanying drawings.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3a is a schematic representation of a practical HCCI cylinder charge composition with a mass average equivalence ratio of 0.5;

FIG. 3b is a schematic representation of an idealized HCCI cylinder charge composition with a mass average equivalence ratio of 0.5;

DETAILED DESCRIPTION

Figure 1:
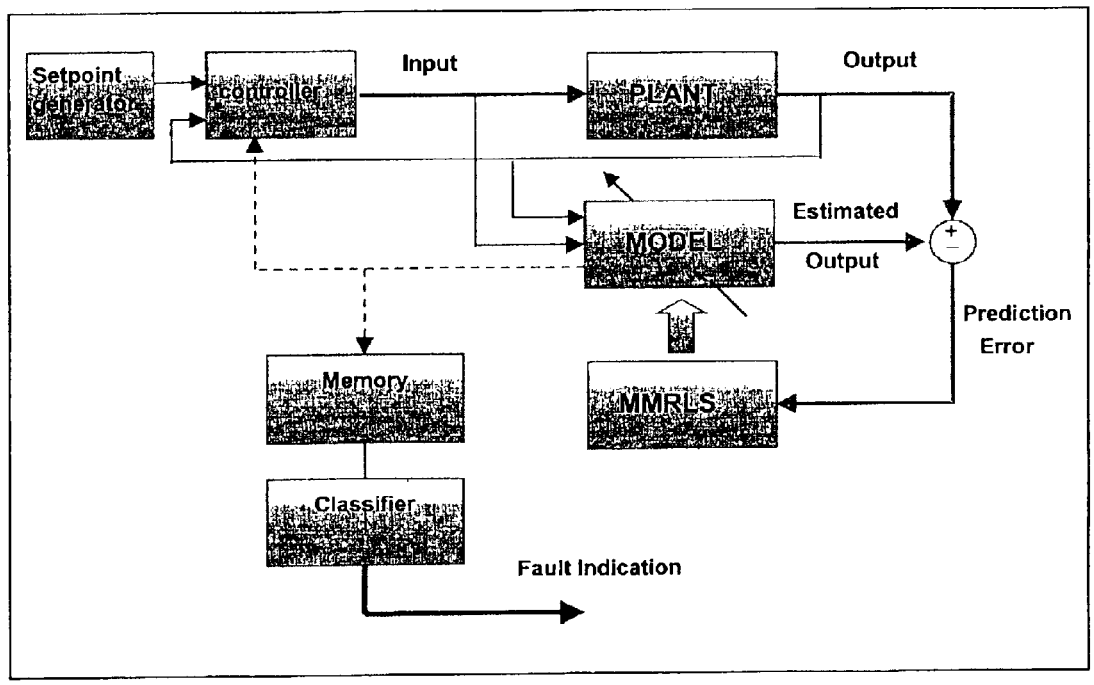
FIG. 1 is a representation of predictive, look-ahead, control algorithm for CIDR engines.

The present invention provides optimum control of a homogeneous charge compression ignition (HCCI) engine (also referred to as a CIDR engine, as will be explained below) with respect to efficiency and emissions. They accomplish this through mechanisms that indirectly control the start of combustion, and the rate of heat release in combustion.

Although not shown, the engine is similar to a conventional HCCI engine, except for the engine controller and associated sensors and actuators for use with the present invention. Accordingly, the engine includes a cylinder block having a cylinder and a reciprocating piston disposed therein. Various intake and exhaust valves communicate with the cylinder to deliver charge to the cylinder and exhaust by products as the engine may also include fuel and air deliver systems, and other standard systems associated with internal combustion engines.

In one embodiment, the methods comprise the use of a predictive model used to determine appropriate controller commands by predicting engine performance associated with a plurality of controller command possibilities. Once optimum controller commands have been identified, they are implemented through actuators that are able to control combustion through indirect means.

In yet another embodiment, the methods comprise the use of a model of an HCCI engine to determine appropriate controller commands. Once controller commands have been identified and implemented, various resulting engine parameters are measured. The controller commands and the engine parameters that resulted from the commands are then used to update the HCCI engine model if deemed necessary.

In still another embodiment, the methods comprise a model that has a plurality of control modes. One or more engine operating parameters are measured and then compared to desired engine operating parameters. One of the plurality of control modes is then chosen based on the difference between the measured engine operating parameters and the desired engine operating parameters.

The following steps provide a broad overview of steps that may be employed in an embodiment of the present invention. They describe the process of calculating a new control action, and using a predictive look-ahead algorithm and are represented schematically in FIG. 1.

1. Compute the likely future load demand. This may include estimating future load and/or speed demands for the powertrain.

2. Calculate new dynamic models for components and/or processor of the engine to be controlled. This may include the air and exhaust system, and the combustion process in the cylinder. Both structure and parameters of the model are adapted. The new results are stored.

3. Decide which cost function to utilize, or adapt a cost function to meet the particular objectives at the present time, wherein a cost function is a mathematical relationship that assist in optimization.

4. Use the cost function to optimize future control actions, and if required apply constraints to actuator movement.

5. Use the calculated control signal to update the various controlling actuators.

6. Check, using a classifier whether the new parameter details fall into one of the fault classes initially taught to the system.

Figure 2:
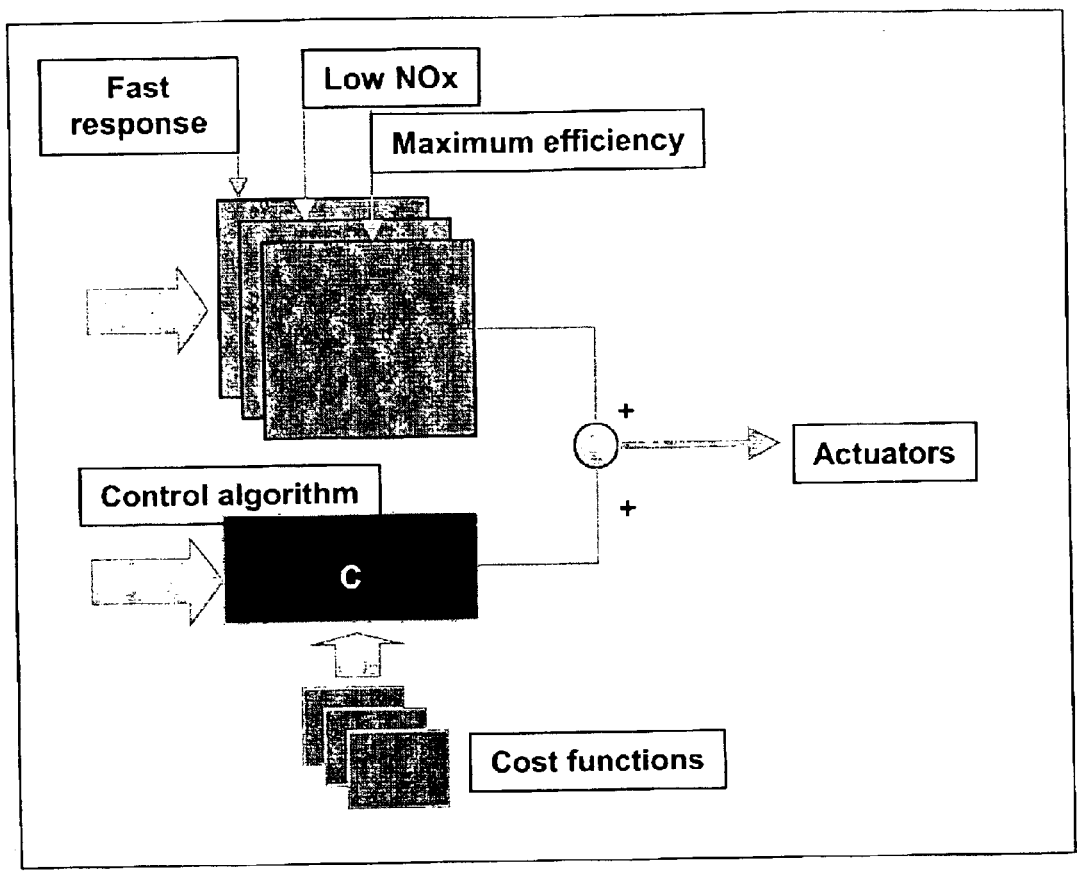
FIG. 2 is a schematic representation of the technique used for calculating actuator settings, and where the control system uses the most suitable cost function.

A predictive, look-ahead, control algorithm for controlling combustion in HCCI engines according to an embodiment of the present invention, is depicted schematically in FIG. 2. The logic of this control algorithm is outlined as follows:

1) The input to the engine (i.e., driver throttle position in automotive applications) is used to determine the new target engine load required.

2) Using knowledge of the maximum time-delay acceptable to avoid a sluggish response feeling for the specific engine in the specific application (e.g. 100 ms), the number of engine cycles available (n) to accomplish a significant change in engine load is determined.

3) Using a predictive model of the engine, which is stored and updated at each control cycle and knowledge of the current and future target operating condition identified as the engine load, the different indirect load control parameters available are screened and ranked based on (A) Response Time, (B) Degree of Authority, (C) Effect on Combustion Phasing, and (D) Engine Efficiency Penalties.

4) Based on the model-based screening in Step 3, an optimum combination of one or more indirect control parameters giving sufficiently fast control with sufficient authority, and with minimum cross-over effects on SOC and efficiency penalties is identified.

5) Using the predictive model of the engine, a control strategy based on the optimum combination of control parameters defined in Step 4 is determined. The control strategy includes prediction of appropriate control parameter settings cycle-by-cycle for the next n cycles such that the engine load is regulated to the target load requested by the driver, while SOC is maintained near TDC.

6) A sensor or sensors (to sense engine vibration or crankshaft angular acceleration and other parameters, or optical phenomena or a calculation where SOC is calculated from ionization or pressure information) are used to sense SOC and other engine operating characteristics such as equivalence ratio in each engine cycle and provide a feedback signal to the predictive model for adaptive learning 7) As the engine condition changes, the predictive algorithm uses a cost function appropriate to either a fast response, a high efficiency operation, or a low $NO_x$ operation. During times of rapid change (as predicted by the load estimation algorithm), the fast response cost function is used. This cost function penalizes error (between actual and demanded load) more than it does control effort. At small error the cost function is adjusted to improve the engine efficiency, by selecting one of the control variables as the key variable to be controlled. For example at mid range load, the intake pressure may be used to control load, and it will be the error in intake pressure that is penalized. Steps 1) through 7) are repeated for every engine cycle.

As previously mentioned, in a HCCI engine, fuel is introduced into the cylinder prior to or early during the compression stroke. As the piston moves towards TDC, the air and fuel mixture is compressed and the temperature and pressure within the cylinder increase until auto-ignition of the air and fuel mixture occurs. The result is combustion characterized by a rapid cascade of detonations in different zones of the cylinder as the piston is approaching TDC.

Fuel can be introduced to the cylinder through techniques similar to those found in many conventional spark ignition engines. Perhaps the most reported method of introducing fuel in HCCI engines is the use of traditional port fuel injection (PFI). An alternative method is the direct injection (DI) of fuel during intake or early in the compression stroke. These methods of introducing fuel can provide for a well mixed air and fuel charge, however, they typically still have significant spatial variations of the air/fuel ratio through the cylinder as shown in FIG. 3a. In particular, these variations may exist with the piston is near TDC Accordingly, the cylinder content of an HCCI engine is not likely to be perfectly homogeneous as is represented in FIG. 3b.

Experimental studies have shown that the heat release rate in practical HCCI configurations is controlled by chemical kinetics, with mixing being a less significant factor. Chemical kinetics are the steps a reaction goes through in proceeding from reactants to products. Some of the factors that affect chemical kinetics include the temperature at which the reaction occurs, and the concentration of the reactants which can include the mass average equivalence ratio, the amount of exhaust gas recirculation, and the amount of injected water to name few. Consequently, the combustion process in HCCI engines can be considered a distributed reaction process, as opposed to a flame propagation (as found in many SI engines) or diffusion flame (as found in many other compression ignition engines).

Following from these observations, the air and fuel mixture in the cylinder of a HCCI engine can be described as a plurality of regions, each defined by its own equivalence ratio as shown in FIG. 3a. Each of the regions can be considered a perfectly stirred reactor. The in-cylinder flow field, including the flow-field generated by the fuel jet if in-cylinder direct injection is used, and the resulting mixing action can determine the size and the mixture strength distribution of these perfectly stirred reactors. However, the reaction rates within each reactor are controlled primarily by chemical kinetics. Additionally, the overall combustion reaction is primarily controlled by chemical kinetics. Given these observations, a different label for HCCI engines, or other engines operating in these modes may therefore be Compression Ignition Distributed Reactions (CIDR). Hereinafter, the term CIDR is used interchangeably with the term HCCI to represent engines with a more or less homogeneous charge.

Although the advantages of CIDR engines have been demonstrated in experimental programs at steady state operating points, the optimization of these engines over a practical range of operating conditions present additional challenges. Some of the technical issues to consider in practical implementations of CIDR technology include:

Cold start: In CIDR engines, combustion is initiated when the air and fuel charge reaches its auto-ignition temperature. When the inlet air and components are cold, a greater temperature change is required of the air and fuel charge before auto-ignition occurs. Also, when the engine is started, the air in the intake manifold may be near atmospheric pressure as a turbocharger or supercharger may not yet be operational. This can mean that less air mass will be delivered to the cylinder, making it more difficult to realize the temperatures required for the air and fuel mixture to auto-ignite. Furthermore, the need to minimize harmful pollutant emissions during such a start-up condition presents an additional constraint on the development of cold start strategies.

Rate of heat release (ROHR): In conventional engines, fluid mechanic sub-processes control the rate of combustion. Such sub-processes include air-fuel mixing in diesel engines or flame wrinkling, flame stretch, and mass and thermal convection by turbulence in spark ignition engines. By contrast, the ROHR is controlled through chemical kinetics in CIDR engines, with ignition occurring spontaneously throughout the cylinder. ROHR can be controlled in CIDR engines by determining the intake charge temperature, fuel/air ratio, and exhaust gas recirculation combinations that are sufficient for the cylinder contents to ignite over the entire engine operating map.

Power density: Many CIDR engines have lower power densities because they frequently operate with lean mixtures and large amounts of charge dilution to achieve appropriate chemical kinetics. However, experiments have shown that turbocharging or supercharging can dramatically increases the attainable power density from CIDR from CIDR engines. Consequently, there exists an optimization trade-off between high boost pressure, which requires a lower compression ratio due to limits on peak cylinder pressure, and the thermal efficiency of the engine. To address this issue, CIDR engines can adopt a mixed-mode operating concept commonly employed for gasoline direct injection (GDI) engines. In this approach, a first mode modes operates much like a homogeneous stoichiometric spark ignition engine for high loads with maximum air utilization; and a second mode operates much like a lean homogeneous charge compression ignition mode for low load and idle operation to achieve maximum fuel economy and low $NO_x$ emissions.

Start of combustion (SOC) timing: From a control standpoint, one of the most striking features of CIDR engines is that there are generally no actuating mechanisms available for directly regulating start of combustion, such as spark timing in SI engines or injection timing in diesel engines. Instead, start of combustion occurs when the fuel-air mixture has been compressed to sufficiently high pressures and temperatures, similar to auto-ignition or knock in SI-engines. Most engine load control parameters, such as charge energy density by temperature, pressure, or equivalence ratio to name a few, tend to impact the in-cylinder conditions. As a result, they may inadvertently affect when combustion begins with respect to top dead center (also known as combustion phasing) and thereby performance, efficiency and emissions. Consequently, the achievement of optimal SOC timing over a practical range of operating conditions, engine speed in particular, is a complex task. Also, coupling exists between SOC timing and many load control variables, which are issues that need to be considered in controlling the start of combustion.

Controlling combustion in CIDR engines, either the start of combustion, or the rate of heat release, represents a challenge to the commercialization of CIDR engines. If auto-ignition occurs prematurely, or the rate of heat release occurs too rapidly, it can cause undue stress on the mechanical components and a lower thermal efficiency through a lower effective expansion ratio. Likewise, if the conditions within the cylinder are not sufficient to promote auto-ignition, partial or complete misfire can occur within the cylinder resulting in very high hydrocarbon emissions and loss of power.

An algorithm of the present invention is now described with reference to FIG. 1 and FIG. 2. The algorithm begins by defining a target engine load and/or speed, which is typically provided directly by the operator of the engine. For instance, in an automotive application, the position of the gas pedal provides this input. This load and/or speed information is translated into combustion requirements, such as a desired start of combustion time, and/or a desired rate of heart release by a set point generator, which are then passed to the controller.

The set point generator may comprise a look up table in some embodiments of the invention. In other embodiments, the set point generator may even comprise models which define the set point through mathematical relationships instead of through lookup tables. Still, in other embodiments, the controller may directly accept speed and/or load demands and compute the combustion requirements itself. Some embodiments of the invention may use a load prediction algorithm to help in the optimization process. The predictive control algorithm seeks to minimize future error, and a knowledge of future demand is helpful in reaching an optimal series of control actions. In such embodiments, the load prediction algorithm is based on the assumption that future control demand on the engine (speed and load) make a smooth transition based on the inertia of the underlying system.

Figure 4:
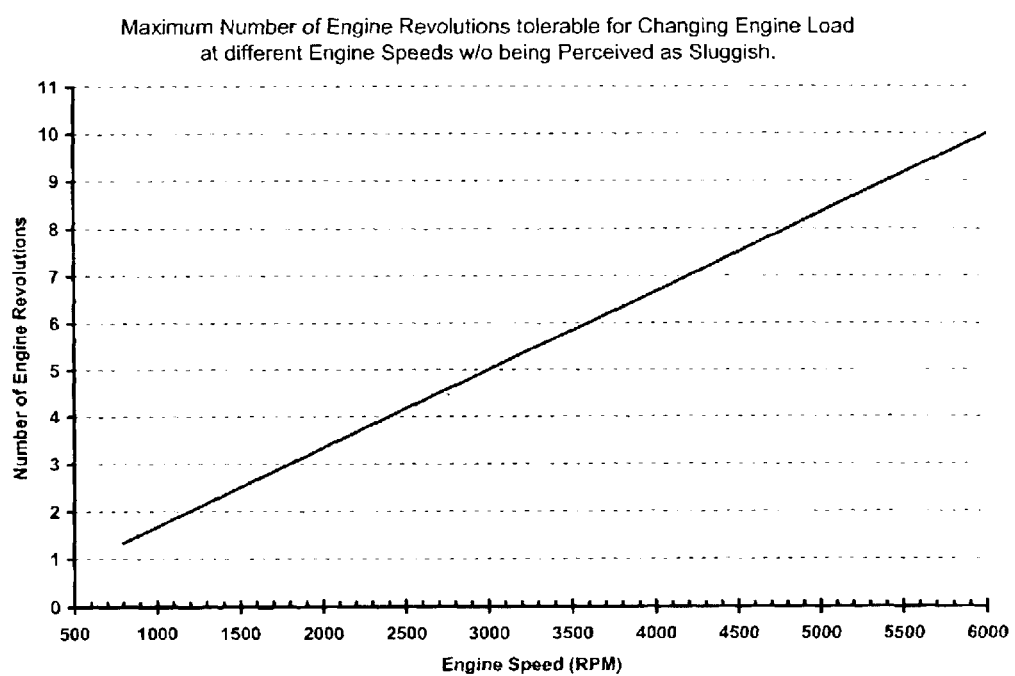
FIG. 4 is a chart showing an example of the maximum number of engine revolutions acceptable for changing engine load at different engine speeds in order to avoid perception of sluggish or slow response.
Figure 5:
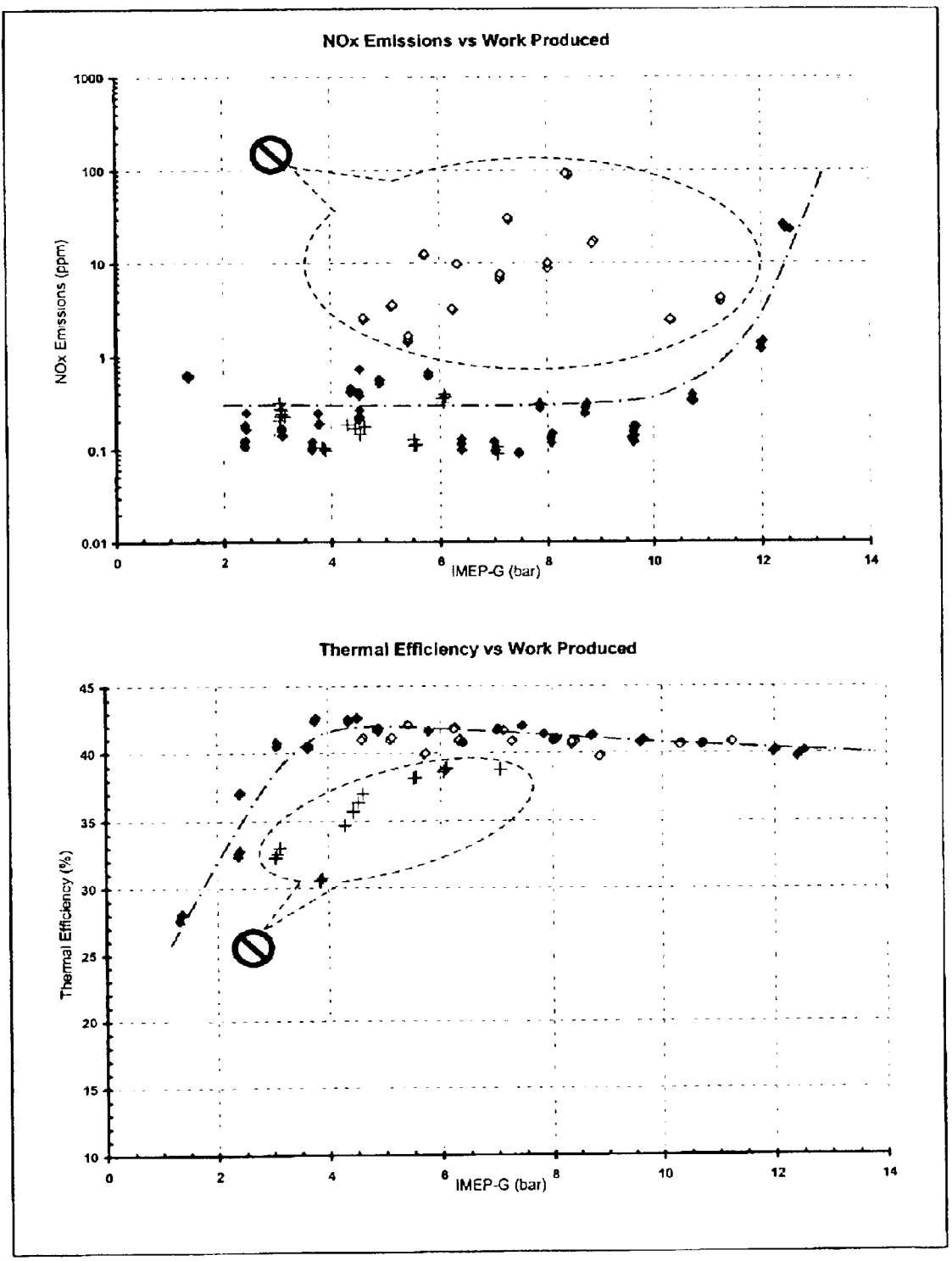
FIG. 5 are two graphs showing experimentally found $NO_x$ emissions and thermal efficiency as functions of gross indicated mean effective pressure (IMEP-G), and illustrating that there are several combinations of the control parameters used in the experiment (air/fuel ratio, intake charge temperature and intake charge pressure) that provide stable and robust engine operation, but sacrifice efficiency and/or $NO_x$ emissions.

Once a target engine load and/or speed are defined, the algorithm chooses which of several control modes are used to control the engine. FIG. 4 is a graph that generally represents the maximum number of engine revolutions that are generally acceptable for changing engine load at a given engine speeds. If more time, or equivalently engine revolutions are taken for changing engine load, the engine response may be perceived as sluggish by the operator. For instance, the in-cylinder condition must be changed in roughly 2 engine revolutions or one engine cycle for a four-stroke engine when the engine is operating at a low engine speed (1200 rpm). Some embodiments of the invention will place a priority on avoiding such a sluggish response. In these embodiments, when a situation exists where the actual engine load is significantly different than the desired engine load, or equivalently the engine load error, the controller will operate in a control mode that places a priority on a fast load response. Once the load error is reduced to a predetermined level, the controller may change to a different control mode, such as one that places a priority on low $NO_x$ emissions, or one that places a priority on maximum efficiency. FIG. 2 is a representative sketch of how each control mode may be used by the controller. Each mode may be said to have its own set of cost functions that are employed by the controller to run the engine. These different cost functions are associated with placing a priority on particular engine performance parameters of groups of such parameters. As mentioned above, such parameters may include fast load response, low $NO_x$ emissions, or maximum efficiency to name a few. FIG. 5 illustrates two examples showing that there are several combinations of control parameters that provide stable engine operations but sacrifice one of engine efficiency and/or $NO_x$ emissions.

In addition to receiving combustion requirement information from the set point generator, the controller may receive input related to any engine operating parameters. This is represented in FIG. 1 by the line connecting the output of the plant (the engine) to the controller. Such parameters may include, but are not limited to air mass flow, cam position, crank position, engine coolant temperature, load demand, intake air temperature, intake air pressure, engine speed, engine load, exhaust gas temperature, exhaust gas recirculation valve position, amount of exhaust gas recirculation, equivalence ratio, exhaust air/fuel ratio, throttle position, valve timing, turbocharger turbine speed, $NO_x$ emission level, variable nozzle turbine setting, variable geometry turbine setting, start of combustion, rate of heat release, and wastegate position as the invention as the invention is not limited in this respect.

Once a control mode is chosen and the engine operating parameters are identified by the controller, it uses a predictive model to evaluate the various actuator commands, or equivalently, the plant input that it may use to control the engine at the present engine operating parameter levels. Such actuator control commands may include, but are not limited to equivalence ratio, intake to exhaust heat-exchanger bypass valve position, variable valve timing, amount of exhaust gas recirculation, variable nozzle turbine setting, variable geometry turbine setting, wastegate setting, water injection timing, water injection amount, fuel injection timing, fuel injection amount, exhaust restriction setting, and electrically assisted turbocharger setting.

The model of the engine can represent a plurality of engine subsystems models, such as its air inlet system, turbocharger or supercharger system, fuel delivery system, charge cooling system, exhaust system, and exhaust gas recirculation system (EGR) to name a few. The model can predict the dynamic behavior of the various subsystems for various actuator control commands, and therefore can predict overall engine performance. Such dynamic behaviors of these systems can include the motions of components, such as predicted turbocharger speeds, predicted drivetrain speeds, and other suitable device conditions as the invention is not limited in this respect. Dynamic behaviors may also refer to the predicted states or characteristics of various engine processes, such as air or fluid transport times within the engine subsystems, and heat and mass transfer behaviors within the engine subsystems to name a few. Furthermore, the chemical kinetics of the cylinder charge, such as ignition delay and thermal formation of nitrogen oxides ($NO_x$) may be predicted by the model.

The predictive model based control of the CIDR engine is more complex than controlling an engine with a direct actuating mechanism. The predictive, look-ahead model based control has models of the engine and its sub-systems that can accurately predict the dynamic behavior, such as transport times and thermal inertia of all key components, and the chemical kinetics of the cylinder charge, such as ignition delay and thermal formation of nitrogen oxides ($NO_x$).

Figure 6:
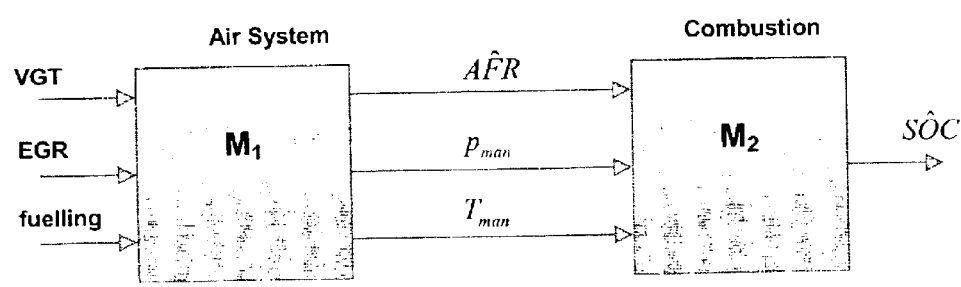
FIG. 6 is an example of a model structure to relate input conditions to the effect on combustion.
Figure 7:
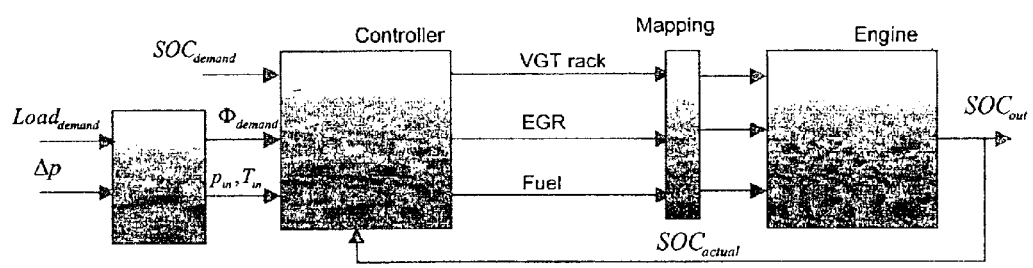
FIG. 7 is a schematic diagram giving an example of the control demands and intermediate signals used in a predictive control algorithm.

The predictive algorithm uses its series of sub-models, in some cases multivariable in character to form the basis for the optimization process. For example, the intake charge pressure and EGR are related through a multivariable framework. A variable geometry turbocharger and an EGR valve will be used to control both the EGR rate and the charge pressure in the inlet manifold. A model of their behavior is stored ready to be used for each control calculation. An example of the format of this model is shown in FIG. 6. Two models are maintained in parallel. An air system model is used to relate VGT and EGR actuator positions and the fuelling setting to the resulting air fuel ratio (AFR). A combustion model is used to relate the charge parameters (air fuel ratio, pressure and temperature) to the combustion phasing. Other models are used to represent other relationships in the engine as represented in FIG. 7.

As previously mentioned, the control of combustion in an HCCI engine is complex because HCCI engines generally lack direct control mechanisms. Predictive model based control of SOC is helpful in addressing this lack of a direct control mechanisms. Knowledge of the steady state behavior of the engine, and the dynamic behavior contained in the model are used as a basis for calculating an optimal response to the current engine conditions. Optimal response as used here means the best response according to the chosen control mode under the current engine operating parameters. In evaluating actuator control commands, the controller applies a plurality of simulated controller commands to the model and predicts the engine output. This is accomplished by using steady state settings for the actuators, and then adding an optimal increment to each setting. The cost functions for dynamic and static optimization are used by this aspect of the algorithm to decide on control commands that relate to the engine output that is being optimized. For instance, if efficiency is being optimized the dynamic cost function will include an estimate of efficiency—and so at each time step, the control will seek to optimize efficiency.

In addition to the considerations above, there exists a collection of indirect control parameters, and at any given steady state operating condition it is possible to find several combinations of these control parameters that will result in acceptable SOC timings. However, these indirect control parameters exhibit different key characteristics at different engine operating conditions such as (1) degree of authority or load control range, (2) response time, (3) effect on combustion phasing SOC, (4) impact on engine-out emissions, and (5) engine efficiency penalties. This is illustrated in FIG. 5 which shows thermal efficiency and $NO_x$ as a function of engine load (or power) for different combinations of intake charge temperature, pressure and equivalence ratio. Clearly, not all control parameter combinations are equally attractive from an emissions and efficiency standpoint.

An ideal load control parameter or mechanism would combine a large load control range with fast response time, and little or no cross-over effect on combustion phasing, engine-out emissions, and thermal efficiency.

Consequently, at any operating condition, there often exists one combination of control parameters that provides optimum engine operation, including high efficiency, low emissions, and good control authority. Thus, given a command to change operating condition, the controller must not only find a combination of indirect control parameter settings that ensures proper engine operation, it must also determine what combination of parameters will change the operating condition fast enough, and with the least adverse effect on engine efficiency and emissions. Once the desired operating condition has been reached, the controller can turn to optimizing for optimum engine efficiency. The predictive, model-based, look-ahead controller according to one embodiment of the present invention is a multi-variable predictive approach which will control several indirect control parameters to ensure sufficiently fast and accurate control of SOC with minimum adverse effect on engine efficiency and emissions.

Embodiments of the control system can also store the steady state values of actuators to meet the engine's required operating parameters including efficiency and emissions. Those steady state parameters will be identified by running a series of steady state conditions on a test bed. At each, the complex objectives are reconciled by minimizing a cost function. Depending on the particular performance requirements, the nature of the cost function may be changed. In this off-line optimization process, the relative importance of the various controls at each load will be identified. The relative importance will result in a mapping function which will translate generic requirements into the particular adjustments needed to effect the control change.

Once a set of actuator control commands are chosen, they are used to control the various actuators that may indirectly control combustion in a CIDR engine. The resulting engine operating parameters are measured, and compared to the values predicted by the model to define a prediction error. These values may include any of the previously mentioned engine operating parameters, and in particular, they may include combustion characteristics, such as start of combustion and rate of heat release. Such combustion characteristics may be measured with accelerometer that detects vibrations associated with the combustion process, although other methods for sensing the combustion process may be used as the invention is not limited in this respect. The prediction error may be evaluated through any means known to those in the art. One of such means includes a multi-mode recursive least squares step which tracks the history of the square of the error. Once the prediction error is evaluated, it can be used to update the model in efforts to minimize future prediction errors as represented in FIG. 1.

The model is able to use feedback signals for adaptive learning to modify characteristic parameters such as the auto-ignition characteristics of fuel so that variations or disturbances can be accommodated. Such variations or disturbances may include changes in fuel quality and composition between different fill-ups, or the gradual fouling of heat exchangers within the engine to name a few, although other factors may be included as the invention is not limited in this respect. These variations and disturbances can be accounted for by changing the model. Furthermore, a classification algorithm may be used in some embodiments of the invention to decide whether the underlying cause of the disturbance or variation should require the attention of the engine operator. Such attention can include alerting the operator to a change in the quality of the fuel, or alerting the operator that heat the heat exchangers require maintenance although other information could be provided to the operator as the present invention is not limited in this respect.

Figure 8:
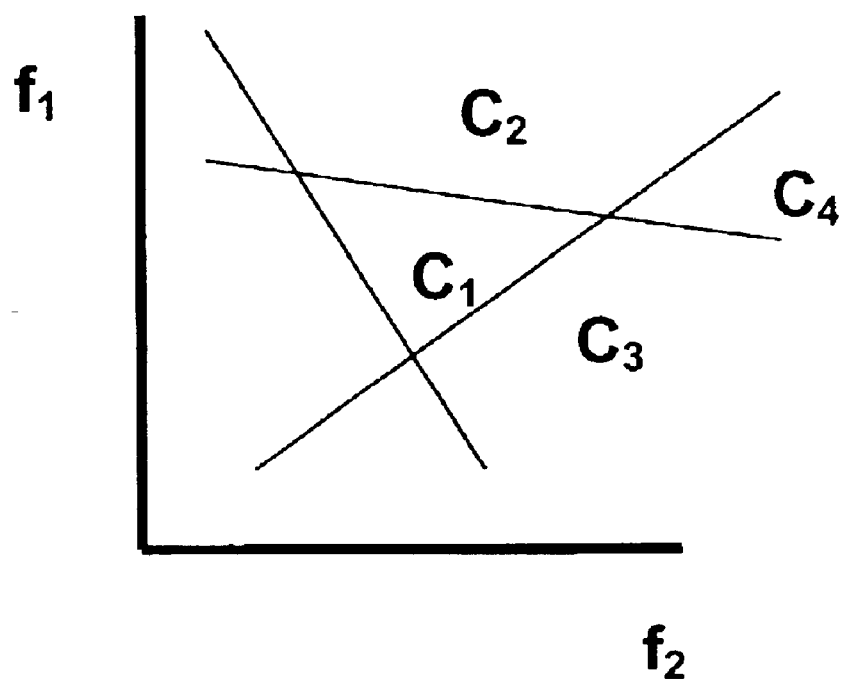
FIG. 8 illustrates a feature space showing four fault classes C1 to C4, with two features, f1 and f2.

FIG. 8 shows an example of how the algorithm may identify such variation and disturbances (faults) including changes in delivered fuel quality. Two features that are coupled to fuel quality, f1 and f2, may be used as indexes into a feature space. The classification is indicated by the area of the space. In practice there may be more than two features used. When the indexes correspond to an area associated with a particular fault, such as C1, C2, C3, or C4, a particular alert may be provided to the engine operator.

These predictive models offer several advantages over other types of control algorithms such as feedback on error only and feedforward with feedback. Unlike the feedback approaches, the predictive approach can be fast with tailored robustness and, therefore, useful for misfire avoidance. The predictive approach can also be used in multi-variable form with constraints, allowing for precise load control. Furthermore, the predictive control approach can be used for accurate SOC control since future load demand can be taken into account. Because the predictive control is formulated as an optimal control, the algorithm makes best use of the actuation energy available. Another feature is illustrated in FIG. 8 which shows a mapping process which takes the controller output signals and adapts them to the particular needs of an engine. In this way the controller may be adapted to a new design or different configuration.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of controlling combustion in a compression ignition distributed reaction engine to a desired behavior, the method comprising:
    sensing at least one engine operating condition;
    predicting, based at least in part on the at least one sensed engine operating condition, a dynamic engine behavior; and
    setting at least one actuator to a desired set point based, at least in part, on the at least one of the predicted dynamic behavior and the chemical kinetics to obtain the desired engine behavior,
    sensing a resulting engine behavior and further predicting, based at least in part on the at least one sensed engine operating condition and the resulting engine behavior, at least one of the dynamic behavior of the at least one engine component or process, and chemical kinetics of an air/fuel charge; and
    determining whether a short response time or engine efficiency is a desired engine behavior to be achieved and wherein setting the at least one actuator comprises identifying at least one actuator that, when actuated, will yield the determined desired engine behavior.

2. The method according to claim 1, wherein the dynamic behavior is one of an air transport time and a charge transport time.

3. The method according to claim 1, wherein the chemical kinetics is $NO_x$ formation.

4. The method according to claim 1, wherein the chemical kinetics is ignition delay.

5. The method according to claim 1, wherein sensing the at least one engine operating condition comprises sensing an engine load.

6. The method according to claim 1, wherein setting the at least one actuator comprises setting the at least one actuator to the desired set point within a time that is based on a number of engine rotations.

7. The method according to claim 1, wherein setting the at least one actuator comprises setting the at least one actuator within 100 milliseconds of sensing the at least one engine operating condition.

8. The method according to claim 1, wherein setting the at least one actuator comprises identifying a plurality of actuators to set and identifying a subset of the plurality of actuators to set that will produce the desired engine behavior within a desired response time.

9. The method according to claim 1 wherein setting the at least one actuator comprises identifying a plurality of actuators to set and identifying a subset of the plurality of actuators to set that will produce the desired engine behavior with a least impact on engine efficiency.

10. The method according to claim 1, wherein sensing at least one engine operating condition comprises sensing an engine throttle position.

11. The method according to claim 1, wherein sensing a resulting engine behavior comprises sensing engine vibration.

12. The method according to claim 1, wherein sensing a resulting engine behavior comprises sensing a start of combustion.

13. The method according to claim 1, wherein sensing a resulting engine behavior comprises sensing an angular acceleration of a crankshaft of the engine.

14. A method of controlling combustion in a compression ignition distributed reaction engine, the method comprising:
    providing an engine controller that includes:
        a plurality of control modes, including: an engine response control mode with an engine response time minimizing cost function and an engine efficiency control mode with an efficiency maximizing cost function;
        a model of engine operation, the model adapted to receive a plurality of sets of simulated actuator control parameters and engine operating parameters and to provide predicted engine output for each set of simulated actuator control parameters;
    operating the engine in the engine efficiency control mode;
    providing a desired engine response requirement and engine operating parameters to the controller;
    changing from the engine efficiency control mode to the engine response control mode when the engine efficiency control mode cannot meet the desired engine response requirement;
    evaluating a plurality of sets of actuator control parameters by applying a corresponding plurality of sets simulated control parameters and the engine operating parameters to the model, which in turn employs the response time minimizing cost function to provide corresponding sets of predicted engine output;
    comparing the plurality the sets of predicted engine output with the desired engine response requirement; and
    controlling the engine by implementing a set of the plurality of actuator control parameters that best satisfies the engine response time minimizing cost function.

15. The method of claim 14, wherein the desired engine response requirement is an engine speed.

16. The method of claim 14, wherein the desired engine response requirement is an engine load.

17. The method of claim 14, further comprising:
    measuring actual engine output and updating the model based on a difference between the predicted engine output and the actual engine output.

18. The method of claim 17, wherein the actual engine output includes an actual start of combustion time and the predicted engine output includes a predicted start of combustion time.

19. The method of claim 14, wherein controlling comprises controlling the engine with the one of the plurality of actuator control parameters such that the desired engine response requirement is met within 100 milliseconds of implementing the one of the plurality of actuator control parameters.

20. The method of claim 14, wherein the plurality of engine operating parameters are chosen from the group consisting of: air mass flow signal, cam signal, crank angle signal, engine coolant temperature, load demand, intake air temperature, intake air pressure, engine speed, engine load, exhaust gas temperature, exhaust gas recirculation valve position, amount of exhaust gas recirculation, equivalence ratio, exhaust air/fuel ratio, throttle position, valve timing, turbocharger turbine speed, $NO_x$ emission level, variable nozzle turbine setting, variable geometry turbine setting, and wastegate position.

21. The method of claim 14, wherein the actuator control parameters are selected from a group consisting of: equivalence ratio, intake to exhaust heat-exchanger bypass valve position, variable valve timing, amount of exhaust gas recirculation, variable nozzle turbine setting, variable geometry turbine setting, wastegate setting, water injection, fuel injection timing, fuel injection amount, exhaust restriction, and electrically assisted turbocharger setting.

22. The method of claim 14, wherein the controller further comprises at least one additional control mode selected from the group consisting of: a control mode to optimize load control range, a control mode to optimize effects on combustion phasing of start of combustion, and a control mode to optimize engine emissions.

23. The method of claim 14, wherein the engine efficiency control mode is an engine fuel consumption control mode.

* * * * *

UNITED STATES PATENT AND TRADEMARK OFFICE
CERTIFICATE OF CORRECTION

PATENT NO. : 6,953,024 B2
APPLICATION NO. : 10/223573
DATED : October 11, 2005
INVENTOR(S) : Jan-Roger Linna et al.

It is certified that error appears in the above-identified patent and that said Letters Patent is hereby corrected as shown below:

On the title page, item [75],

INVENTOR(S):

Jan-Roger Linna, Boston, MA (US);
Robert Bowyer, Cambridge, (GB);
Bernard J. Challen, Sussex (GB);
John Paul Mello, Arlington, MA (US);
Peter Palmer, Carson City, NV (US);
Richard Stobart, Cambridge, MA (US)

should read,

INVENTOR(S):

Jan-Roger Linna, Boston, MA (US);
Bernard J. Challen, Sussex (GB);
John Paul Mello, Arlington, MA (US);
Peter Palmer, Carson City, NV (US);
Richard Stobart, Cambridge (GB)

Signed and Sealed this

Twenty-ninth Day of April, 2008

JON W. DUDAS
*Director of the United States Patent and Trademark Office*